United States Patent
Sanghvi (10) Patent No.: US 10,182,481 B2
(45) Date of Patent: Jan. 15, 2019

(54) BI-LEVEL LOW VOLTAGE DIMMING CONTROLLER FOR LIGHTING DRIVERS

(71) Applicant: RAB Lighting Inc., Northvale, NJ (US)

(72) Inventor: Ankit Sanghvi, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 15/496,793

(22) Filed: Apr. 25, 2017

(65) Prior Publication Data

US 2017/0311405 A1 Oct. 26, 2017

Related U.S. Application Data

(60) Provisional application No. 62/327,727, filed on Apr. 26, 2016, provisional application No. 62/336,924, filed on May 16, 2016.

(51) Int. Cl.
*H05B 37/02* (2006.01)
*H05B 33/08* (2006.01)

(52) U.S. Cl.
CPC ..... *H05B 33/0854* (2013.01); *H05B 37/0218* (2013.01)

(58) Field of Classification Search
CPC ............ H05B 33/0854; H05B 37/0218
USPC ........................................... 315/307
See application file for complete search history.

(56) References Cited

U.S. PATENT DOCUMENTS

| | | | |
|---|---|---|---|
| 5,248,919 A | 9/1993 | Hanna et al. | |
| 6,023,155 A | 2/2000 | Kalinsky et al. | |
| 6,152,577 A | 11/2000 | Rizkin et al. | |
| 6,380,696 B1 | 4/2002 | Sembhi et al. | |
| 6,531,831 B2 | 3/2003 | Chou et al. | |
| 6,815,625 B1 | 11/2004 | Leopold et al. | |
| 7,902,769 B2 | 3/2011 | Shteynberg et al. | |
| 8,278,832 B2 | 10/2012 | Hung et al. | |

(Continued)

FOREIGN PATENT DOCUMENTS

| | | |
|---|---|---|
| WO | 2011100803 | 8/2011 |
| WO | 2013091100 | 6/2013 |

OTHER PUBLICATIONS

Lutron, "Maestro Wireless Advanced Programming Mode (APM)", Revision C, Jun. 2012.

(Continued)

*Primary Examiner* — Don Le
(74) *Attorney, Agent, or Firm* — SmithAmundsen LLC; Dennis S. Schell; Kevin C. Oschman (57) ABSTRACT

An illustrative bi-level dimming controller for coupling to a dimming control input of a lighting driver includes a dimming preset selector for setting a preset dim level, and a dimming control circuit having variable impedance and providing a constant dimming voltage output for a preset dim level, even if the current supplied to or impedance coupled to the dimming controller changes. The dimming control circuit is responsive to the preset dim level to drive a dimming voltage output proportional to the preset dim level. The dimming controller may also include a dim enable circuit responsive to a detection signal to selectively couple and uncouple the dimming signal output with the dimming control input of the lighting driver, thereby providing switching between a preset dim level and a full light level. The detection signal may be electrically isolated from the dimming voltage output.

20 Claims, 5 Drawing Sheets

(56) References Cited

U.S. PATENT DOCUMENTS

| | | | |
|---|---|---|---|
| 8,441,210 B2* | 5/2013 | Shteynberg | H05B 33/0815 315/209 R |
| 8,829,812 B2* | 9/2014 | Veltman | H05B 33/0815 315/291 |
| 8,884,541 B2 | 11/2014 | Wu | |
| 9,006,998 B2 | 4/2015 | Dan et al. | |
| 9,648,690 B1* | 5/2017 | Chou | H05B 33/0815 |
| 9,906,153 B2* | 2/2018 | Chen | H02M 5/2573 |
| 2009/0237007 A1* | 9/2009 | Leng | H05B 33/0815 315/297 |
| 2011/0148318 A1 | 6/2011 | Shackle et al. | |
| 2011/0254469 A1* | 10/2011 | Ruan | H05B 33/0809 315/307 |
| 2013/0162168 A1 | 6/2013 | Ostrovsky | |
| 2013/0175931 A1 | 7/2013 | Sadwick | |
| 2013/0187570 A1 | 7/2013 | Oshima et al. | |
| 2013/0188105 A1 | 7/2013 | Dobrenko et al. | |
| 2013/0271040 A1 | 10/2013 | Chen et al. | |
| 2014/0001971 A1 | 1/2014 | Kumar et al. | |
| 2014/0265900 A1* | 9/2014 | Sadwick | H05B 33/0803 315/200 R |
| 2014/0265916 A1* | 9/2014 | Melanson | H05B 33/0809 315/291 |
| 2015/0002050 A1* | 1/2015 | Han | H05B 33/0815 315/307 |
| 2016/0205742 A1* | 7/2016 | Seki | H05B 33/0827 315/122 |
| 2016/0351165 A1* | 12/2016 | Chang | G06F 3/04842 |

OTHER PUBLICATIONS

Phihong, "Bi-Level Dimming for LED Lighting Fixtures PDA-PMD Low Cost Dimming Module".

* cited by examiner

BI-LEVEL LOW VOLTAGE DIMMING CONTROLLER FOR LIGHTING DRIVERS

CROSS-REFERENCE TO RELATED APPLICATIONS

This nonprovisional application claims the benefit of U.S. Provisional Application No. 62/327,727, filed Apr. 26, 2016, and also claims the benefit of U.S. Provisional Application No. 62/336,924, filed May 16, 2016, the entireties of which are hereby incorporated herein by reference.

TECHNICAL FIELD

The present invention relates to low voltage controls for lighting systems, and particularly, to bi-level lighting control for 0-10 volt DC (VDC) dimmable LED drivers and other lighting power devices.

BACKGROUND

Bi-level lighting includes two lighting levels, with one level being at or near 100% of available light output and the other level being significantly less than 100% of available light output. Energy codes in the United States and other countries generally require multi-level lighting control for various lighting applications to conserve energy during periods of no occupancy. During periods of occupancy a full lighting level is applied. To be compliant during periods of no occupancy, less than the full lighting level is applied. These energy codes are applicable to various lighting applications, for example, those requiring continuous lighting. For example, an interior stairwell, parking garage, or parking lot require the full lighting level when occupied and less than the full lighting level when not occupied.

Figure 1:
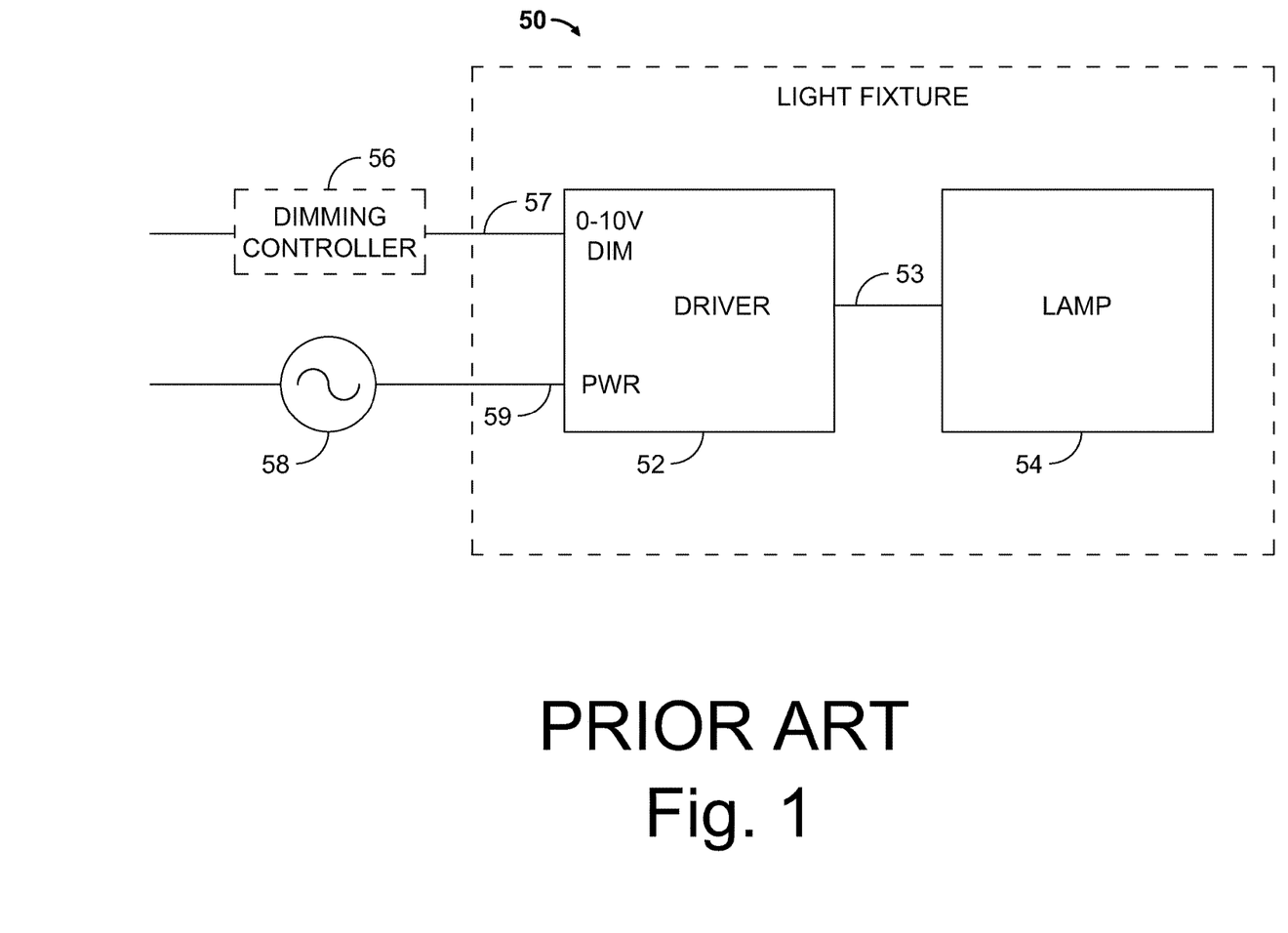
FIG. 1 is a block diagram of a prior art light dimming system.

A prior art 0-10 VDC dimming controller 56 associated with a light fixture 50 is illustrated in FIG. 1. The light fixture includes a driver 52, driver output 53 and lamp 54. The driver 52 includes a 0-10 VDC dimming control input 57 connected to the prior art dimming controller 56. The driver 52 also includes a power input 59 connected to an AC power source 58. Typical prior art 0-10 VDC dimming controllers provide a 0-10 VDC dimming input signal based in part on an expected input impedance of the driver it is associated with. If the output impedance of the prior art dimming controller 56 and the input impedance of the 0-10 VDC dimming control input 57 of the driver 52 are incompatible, the driver output signal 53 coupled to lamp 54 may provide a brighter or dimmer light level than expected due to this impedance incompatibility.

Some light level controllers, including bi-level lighting controllers require a minimum load to function as expected, for example, three or more light drivers coupled to the controller. Other bi-level lighting solutions simply switch off some but not all of the lighting fixtures; however, this can generate undesirable variable lighting patterns.

Some bi-level lighting solutions include an all-in-one lighting device. For example, a device with a sensor and bi-level switching device integrated within a single structure. However, code compliance requires that low voltage wiring such as that used for bi-level switching to be run separately from higher voltage wiring used to power the lighting. Running separate low and high voltage conduits to each light fixture can be expensive and sometimes impractical, especially when retrofitting existing structures and installations.

Additionally, a low voltage 0-10 VDC bi-level controller from a particular manufacture may not be compatible with a 0-10 VDC dimming control input for a driver from a different manufacture, due to different electrical configurations, for example, different input impedances, as described for the prior art dimming controller 56 illustrated in FIG. 1. For example, a driver provides a current to a bi-level controller and responds to a change in the bi-level controller based on a predetermined resistive load. If a bi-level controller provides a different predetermined resistive load, or if multiple drivers are attached in parallel to a single bi-level controller, the lighting output will likely be different than expected with compatible drivers and the bi-level controller because of the change of impedance coupled to the bi-level controller output when the 0-10 VDC dimming control inputs are wired in parallel.

More specifically, a typical 0-10 VDC dimming control input of a LED drivers and other lighting power devices (collectively "driver(s)") is a current source with an impedance designed such that the voltage drop across the dimming input is 10 VDC when no dimming controller is connected to the driver. Connecting an impedance source as a dimming controller across the dimming input, for example, a fixed or variable resistor, or a 0-10 VDC power supply, provides an input impedance across the dimming input that is less than the impedance of the current source, resulting in a drop in the dimming voltage across the dimming input to below 10 VDC. The resulting dimming input voltage is sensed by the internal dimming circuit of the driver, which controls the voltage output of the driver to dim the lighting proportionally to the sensed dimming input voltage.

If a fixed impedance source is used as a dimming controller for more than one driver, the resulting dim level for the lighting may be different for a selected dimming level when the dimming controller is connected to a different driver or to a different number of drivers with dimming inputs connected in parallel. When different or multiple driver are connected in parallel the impedance of their dimming control input(s) may change relative to the static impedance for the dimming level set by the dimming controller connected across their dimming control input(s). Also, the total current supplied by the one or more current sources changes when a different or multiple parallel connected dimming control inputs are delivered to the dimming controller. Even though no change has been made in the dimming controller to change the dimming level, the change in impedance and/or current presented to the internal dimming circuit of the driver results in a change in the voltage across the dimming control input(s) and an unintended change to the resulting output of drivers dimming the lights to a different level than for a single driver or different drivers connected to the dimming controller.

Additionally, lighting applications requiring selectively switching between a preset selected dimming level and no dimming (full-on) are generally based on a control signal other than the 0-10 VDC proportional dimming signal, for example, an output of an occupancy or daylight detection sensor. Condition detection sensors typically provide a relay output that is normally open and is closed upon detection of a condition. The relay is typically used to switch the 120 VAC supply provided to one or more lighting drivers. In this configuration, the lighting can be controlled to switch the driver and lighting between off and full-on, or between off and a preset dim level; however, the configuration does not accommodate switching between a preset dim level and full-on.

SUMMARY

The illustrative bi-level dimming controller according to the present disclosure is designed to be compatible with lighting systems and lighting drivers configured for industry standard 0-10 VDC dimming, to overcome problems associated with coupling multiple drivers to a dimming controller, and to adapt lighting installations to be compliant with regulatory energy reduction/efficiency requirements, for example, California's 2013 Title 24, Part 6, Building Energy Efficiency Standards. For example, a detection signal input of the bi-level dimming controller can be electrically coupled with a photocell to switch the lighting to a full-on level during darkness and to a reduced level during daylight, or coupled with a dusk-to-dawn photocell and motion detector module to switch the lighting from a preset dim level used for darkness to a full-on level upon detection of motion. Additionally, the detection signal input of the dimming controller can be electrically coupled with an actuator, for example, an occupancy sensor to switch the lighting to a full-on level during occupancy and a preset dim level when no occupancy is detected. Advantageously, the detection signal input can be a high or low voltage signal and can be an AC or a DC signal.

An illustrative bi-level dimming controller for coupling to a dimming control input of one or more lighting drivers includes a dimming preset selector for setting a preset dim level, and a dimming control circuit having variable impedance and providing a constant dimming voltage output for a preset dim level, even if the current supplied to or impedance coupled to the dimming controller changes. The dimming control circuit is responsive to the preset dim level to drive a dimming voltage output proportional to the preset dim level. The dimming control circuit is further responsive to vary the impedance to maintain the dimming voltage output regardless of the current provided by the dimming control input. The dimming controller may also include a dim enable circuit responsive to a detection signal to selectively couple and uncouple the dimming signal output with the dimming control input of the lighting driver, thereby providing switching between a preset dim level and a full light level. The detection signal and power source for the bi-level dimming controller may be electrically isolated from the dimming voltage output. The dim enable circuit may include an isolated switch, (e.g., a relay or optocoupler) for selectively connecting and disconnecting a supply or return (e.g. ground) of the dimming voltage output with the dimming control input of the driver. The dimming preset selector may be a variable resistor, a series of selective resistors, a zener diode, a PWM and capacitive circuit, or a digital or other integrated circuit providing one or more preset voltage references. The voltage control output can be provided by a voltage buffer to provide impedance transformation, for example, an operational amplifier ("op amp") configured as a voltage follower.

A typical 0-10 VDC dimming circuit inside the driver is a current source with impedance such that the voltage drop across dimming wires is typically 10 VDC direct current (DC) when no dimmer control is connected. When an impedance source (resistor or 0-10 VDC capable power source) causes an equivalent input impedance across the dimming wires to be less than that of the current source, the voltage drops below 10 VDC. This resulting voltage is sensed by the dimming control circuit of the driver which proportionally dims the lighting. Unlike a simple resistor with a constant impedance, the op amp voltage buffer used in the illustrative embodiment of the present disclosure is capable of maintaining a constant dimming voltage output proportional to the preset dim level by changing impedance proportional to the current supplied to the dimming control circuit by the current source of the dimming control input of the driver. Thus, the dimming voltage output is independent of current source impedance due to a change in driver or due to a different number of driver dimming control inputs wired in parallel. The dimming control circuit maintains a constant voltage across the dimming control input (as set by the preset dim level) by dynamically changing impedance in proportion to the current supplied.

An illustrative dimming controller for coupling to a dimming control input of a lighting driver includes, a dimming preset selector for a light dimming level, a dimmer control circuit having an impedance transforming voltage buffer and a dimming output voltage, the dimming control circuit responsive to the preset light dimming level to drive a dimming voltage output proportional to the preset dim level, the dimming control further responsive to maintain the dimming voltage output for a varied electrical characteristic of the dimming control input (e.g. impedance), and a dim enable circuit responsive to a detection signal to selectively couple and uncouple the dimming voltage output to the dimming control input of the lighting driver, thereby providing switching between a preset light dimming level and a full light level. The detection signal can be electrically isolated from the dimming output voltage. A supply voltage for the bi-level dimming controller can also be isolated from the dimming output voltage. The impedance transforming voltage buffer can be an operational amplifier configured as a voltage follower.

An advantage of the present invention is a sensing device can be remote from the dimming controller, whereas many alternatives include integrating the sensing device within structure of dimming controller. The present invention is compatible with off-the-shelf sensing devices, whereas many alternatives require expensive specialized sensing devices. The sensing device can be integrated within structure of light fixture or remote from light fixture, for example, in a junction box. The sensing device can power a select input of the dimming controller.

Another advantage of the present invention is avoiding installation costs of low voltage conduits separate from high voltage (line voltage) conduits. For example, in a parking garage wired for 120 VAC line voltage, there is generally not a low voltage wiring conduit installed in the parking garage structure. Using the presently disclosed controller, a common low cost sensing device can be located remote from lighting fixtures and be wired to line voltage, for example, 120 VAC. The detection signal provided by the sensing device can also be 120 VAC so that is can be run to each light fixture, or a bank of light fixtures within existing line voltage conduits. The low cost of the presently disclosed bi-level dimming controller provides an economical solution of including a controller with each individual or each bank of light fixtures, thus avoiding the added cost of running a low voltage conduit from a remote sensor and to each individual or each bank of light fixtures the sensor controls. Many different types of actuator devices or combinations of devices can be used to provide a detection input for the controller, for example, a photocell, an occupancy sensor, the output of a time clock, automated or manual control systems, or a simple electrical switch.

Additionally, unlike some other controllers, the present bi-level dimming controller does not require the lighting driver to provide a specific supply voltage for the controller, but instead can simply be powered by 120 VAC, 240 VAC, or other facility line voltage used to power the light fixtures to be controlled.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

For the purposes of promoting and understanding the principals of the invention, reference will now be made to one or more illustrative embodiments illustrated in the drawings and specific language will be used to describe the same.

Figure 2:
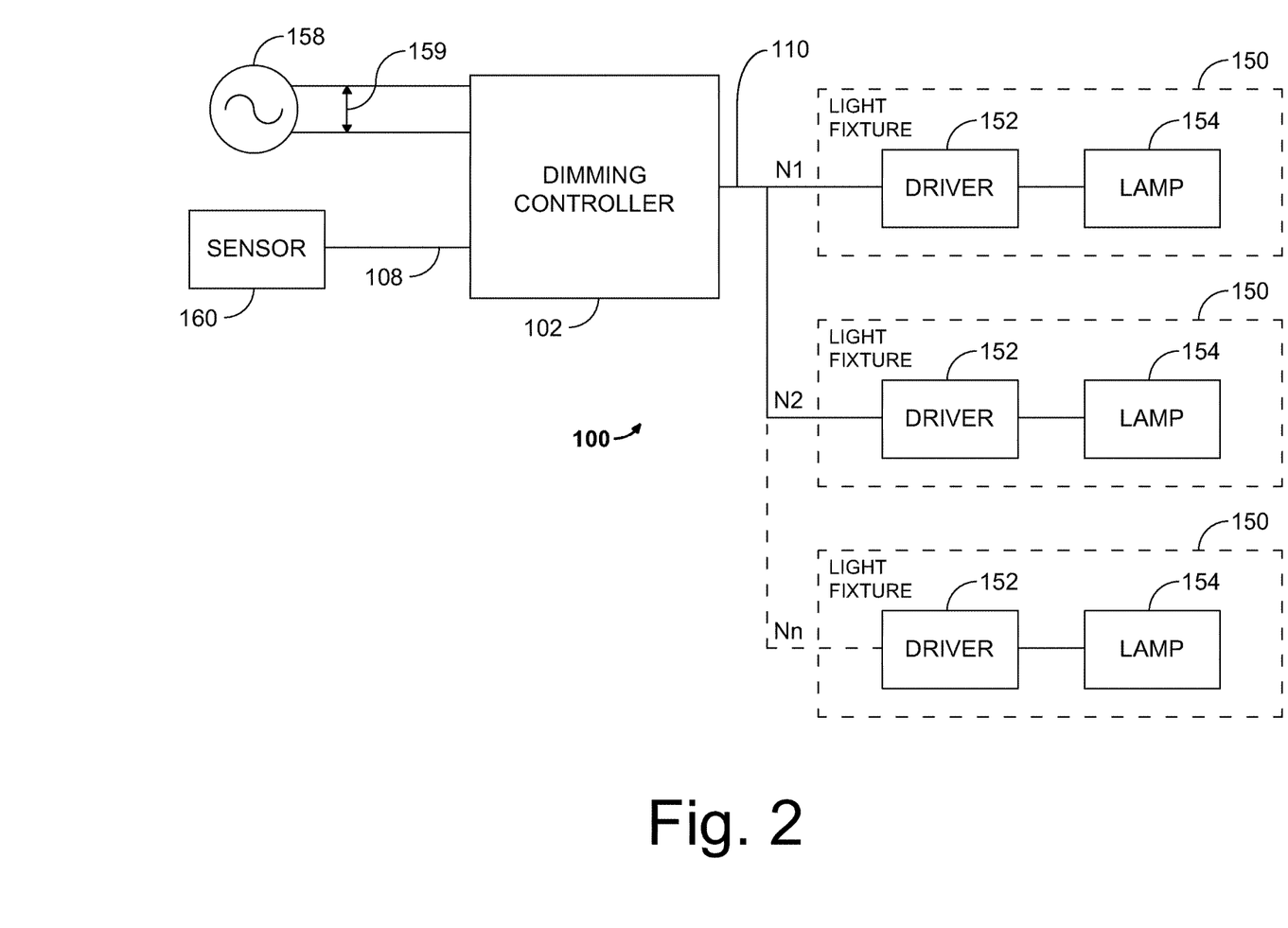
FIG. 2 is a block diagram of a bi-level dimming light system, according to the present invention.
Figure 3:
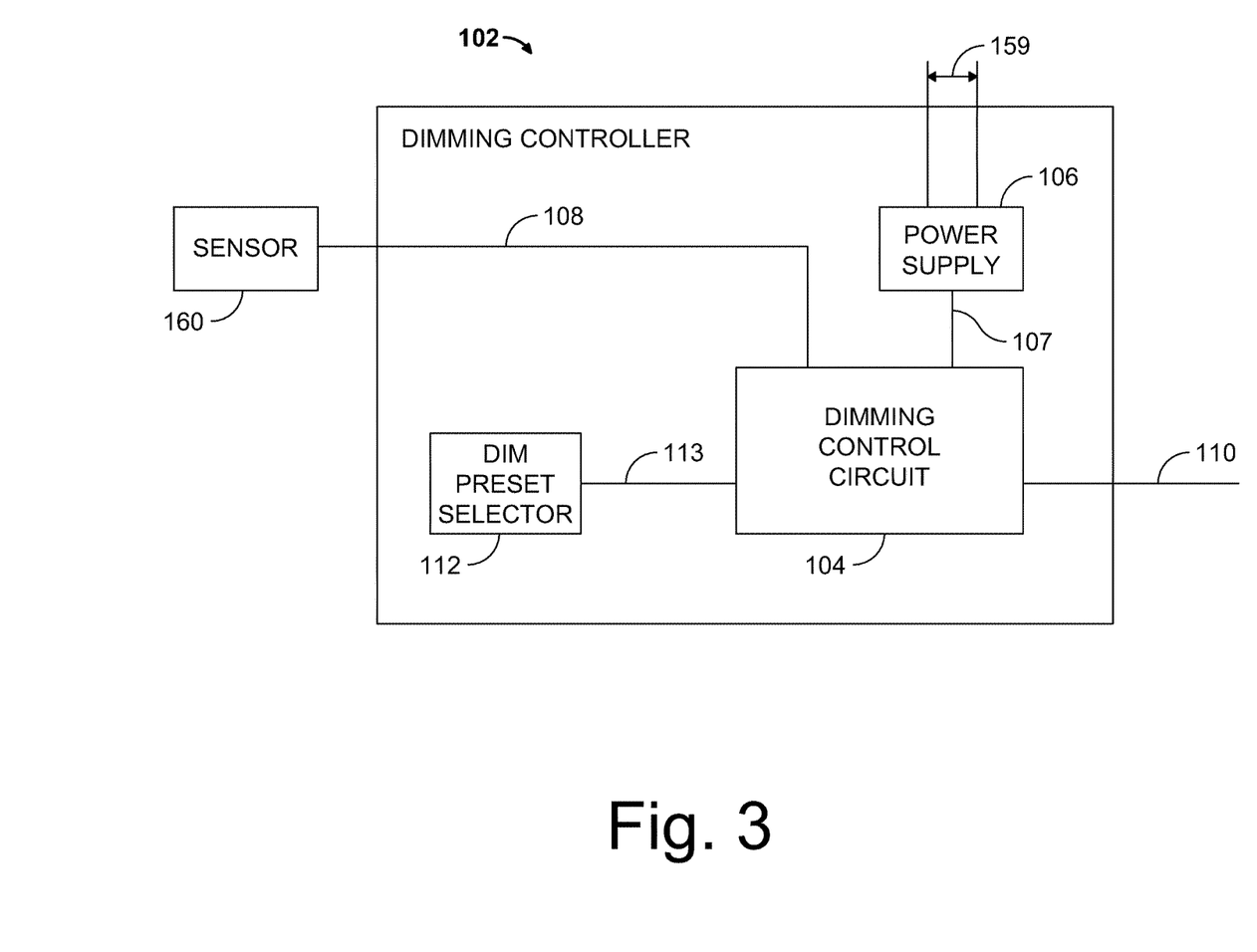
FIG. 3 is a block diagram of a bi-level dimming controller, according to the present invention.

An illustrative light dimming system 100 according to the present disclosure, as shown in FIG. 2, includes a dimming controller 102, a power source 158, power supply input 159, a isolated dimming voltage output 110, an actuator such as a sensor 160, and light fixtures 150. Each light fixture includes a drivers 152 and a lamps 154. The light dimming system 100 may include one or more light fixtures 150, for example, FIG. 2 shows light dimming system 100 with light figures N1, N2 and Nn. The dimming controller 102, as shown in FIG. 3, includes a power supply 106, which is electrically coupled to the power supply input 159, and outputs DC voltage 107. The dimming controller 102 also includes a dimming control circuit 104 that receives a control signal 108 from the 160 sensor or other source, and a preset dim level 113 from a dim preset selector 112. The dimming controller provides a dimming voltage output 110 based on the control signal 108 and the present dim level 113. Advantageously, the power supply circuit 106 and the control signal 108, which may be supplied with a DC or an AC voltage signal, can be electrically isolated from the dimming control circuit 104, which typically provides 0-10 VDC at the isolated dimming voltage output 110.

The power supply input 159 can be configured to receive an AC or a DC voltage, for example 120 VAC. The control signal 108 also can be configured to receive an AC or a DC voltage, (e.g., 120 VAC). For example, the control signal 108 of the bi-level dimming controller 102 can be provided by the output of sensor 160, for example, the motion detection portion of a dusk-to-dawn security lighting module, to switch the lamp 154 from a preset dim level used during darkness to a full-on level upon detection of motion. For example, the bi-level dimming controller 102 can be configured to enable dimming when the control signal 108 is present and to disable dimming (provide a 10 VDC signal at the isolated dimming voltage output 110) upon the absence of control signal 108. Similarly, control signal 108 can be provided by the output of sensor 160, for example, an occupancy sensor, to disable dimming and provide a full-on level when occupancy is detected and the control signal 108 is present, and to enable dimming to a preset dim level when the no occupancy is detected and the control signal 108 is absent.

The isolated dimming voltage output 110 is electrically coupled to the 0-10 VDC dimming control input of one or more light driver(s) 152 of light fixture(s) 150. When dimming is enabled, the dimming control circuit 104 provides a voltage at the isolated dimming voltage output 110 that is proportional to a preset dim level 113 selected by the dim preset selector 112, for example, between 0 V to 10 V, or between 2.5 V and 10 V. In an industry standard 0-10 VDC dimming system 0 V commands 0% of available light output and commands 100% of available light output. Alternatively or additionally, dimming controller 102 can be configured to provide a voltage at the isolated dimming voltage output 110 between a desirable range when dimming is enabled, for example, between 2.5 V (25%) to 7.5 V (75%).

The illustrative embodiment of the dimming controller 102 is designed such that when the control signal 108 is absent, it normally enables dimming and provides a dimming output voltage 110 between 0-10 VDC to the dimming control input of the lighting driver 152, thereby dimming lamp 154 to a preset dimming level determined by the preset dim level 113 provided by dimming preset selector 112. When the control signal 108 is present, the dimming controller 102 functions to disable dimming so that a full-on light level is provided by the light fixture(s) 150. Alternatively, the dimming controller 102 could be pre-configured or selectively configurable to disable dimming upon the absence of the control signal 108 and enable dimming upon the presence of control signal 108.

Figure 4:
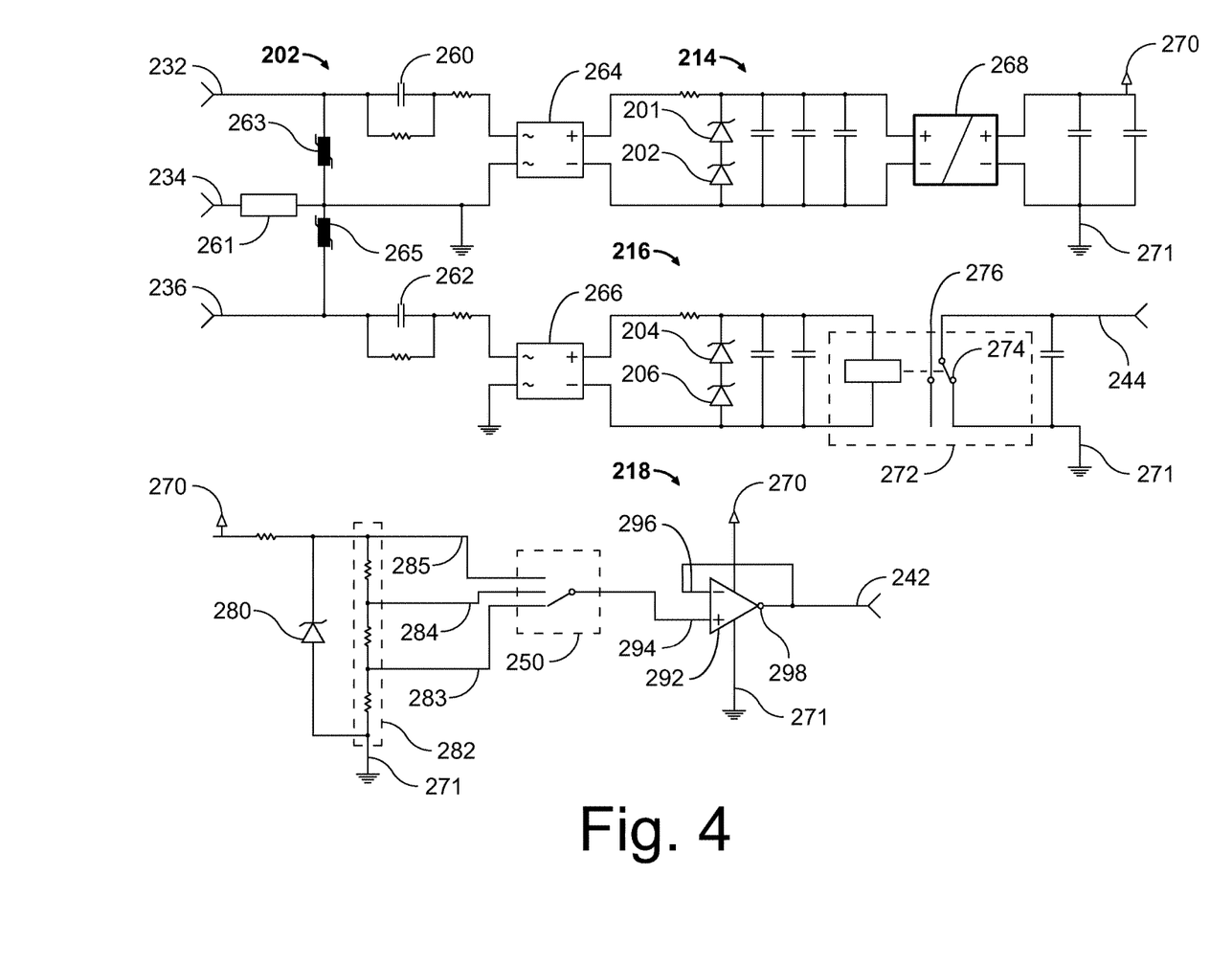
FIG. 4 is an illustrative circuit diagram of a first embodiment of the bi-level dimming controller of FIG. 3.

Referring to FIG. 4, an embodiment of dimming controller 202 includes three primary circuits: a power supply circuit 214, a dim enable circuit 216, and a dimming control circuit 218. The power supply circuit 214 provides power conversion from 120 VAC to provide supply voltage to the dim enable circuit 216 and the dimming control circuit 218, for example, power supply output 270, which may be, for example, 12 VDC. Additionally, the power supply circuit 214 isolates the power source input nodes 232 and 234 from the power supply output nodes 270 and 271.

The positive/hot supply node 232 is coupled to a first terminal of a current limiting input capacitor 260 and the second terminal of input capacitor 260 is coupled to the positive input of a voltage rectifier 264. A fuse 261 is coupled between the negative/neutral supply node 234 and the negative input of voltage rectifier 264. Additionally, an MOV 263 to protect from transient voltage surges is coupled across the power source input node 232 and power source input node 234. The output of the voltage rectifier 264 is provided to zener diodes 201 and 202 arranged in series to provide a regulated voltage, for example, approximately 12 VDC, which is supplied to a DC/DC isolating converter 268, isolating power supply output 270 and associated GND 271 from the power source input voltage 159. The 12 VDC provide by power supply output 270 and GND 271 is used to power both dim enable circuit 216 and dimming control circuit 218. The circuit may be optionally modified to accommodate a DC source voltage, for example, capacitor 260 and rectifier 264 may be omitted.

The dim enable input node 236 is configured to receive an AC dim enable control signal 108 from sensor 160 and is coupled to a first terminal of voltage limiting input capacitor

262. The second terminal of capacitor 262 couples to the positive input of rectifier 266. The circuit may be modified to accommodate a DC control signal 108, for example, capacitor 262 may be removed. The negative/neutral supply node 234 also supplies the negative input of voltage rectifier 264 via the fuse 261. Additionally, an MOV 265 to protect from transient voltage surges is coupled across the dim enable input node 236 and the negative/neutral supply node 234. The output of the voltage rectifier 266 is provided to zener diodes 204 and 206 arranged in series to provide a regulated voltage dim enable, for example, approximately 12 VDC, which is supplied to an isolating switch 272, for example, a relay or an optocoupler. For the example of a relay serving as the isolating switch 272, normally closed contact 274 and normally open contact 276 are used to couple and decouple the negative output node 244 with the GND 271 of isolating converter 268. For example, in the illustrative embodiment, the normally closed contact 274 is connected to GND 271 so that with no voltage provided to dim enable input node 236, the negative output node 244 is coupled with GND 271, and with a voltage provided to the dim enable input node 236, the isolating switch 274 is activated and the negative output node 244 is disconnect from GND 271 and is therefore floating, which has the effect of providing no isolated dimming voltage output 110 and thus the light driver(s) 152 coupled to the bi-level dimming controller 202 switches to the full-on light level.

The isolated 12 VDC provided by power supply output 270 is also coupled to the dimming preset selector 250 of the dimming control circuit 218. In the illustrative embodiment the dimming preset selector 250 provides selection between three discrete dimming levels, 75% (7.5 VDC), 50% (5.0 VDC) and 25% (2.5 VDC). The voltages of the selectable dimming levels are provided by a 7.5V zener diode 280 across a voltage divider 282 including three resistors of equal value coupled across the zener diode 280 and GND 271 to provide additional reference set points for the discrete dimming levels. A mechanical or other switch of dimming present selector 250 couples one of the reference voltage of node 283 (2.5 VDC), node 284 (5.0 VDC), or node 285 (7.5 VDC) to the non-inverting input 294 of a voltage buffer 292. The voltage buffer 292 provides impedance transformation and can be, for example, an operational amplifier ("op amp") configured as a voltage follower by coupling the output 298 of the voltage buffer 292 to the inverting input 296. The output 298 of voltage buffer 292 is coupled to the positive output node 242 and matches the voltage level provided by the dimming preset selector, as long as relay 272 is unpowered, providing GND 271 to the negative output node 244. Given that the output 298 for an op amp is typically an open collector of a transistor such as a MOSFET, the voltage received at the non-inverting input 294 can be provided at the output 298 for a wide range of input impedances of any one or more lighting driver(s) 152.

Alternatively, the dimming preset selector 250 can include other forms of selectable voltage or current references, discrete or proportional, for example, a potentiometer in place of the voltage divider 282 to provide a selectable and proportional variable voltage to non-inverting input 294 of voltage buffer 292, providing a continuous dimming range, for example, between 0% and 100%. Alternatively, in one embodiment the preset selector 250 provides a single non-changeable voltage or current reference set point for the preset dim level, for example, from a zener diode and/or from a node of a voltage dividing resistor network.

Figure 5:
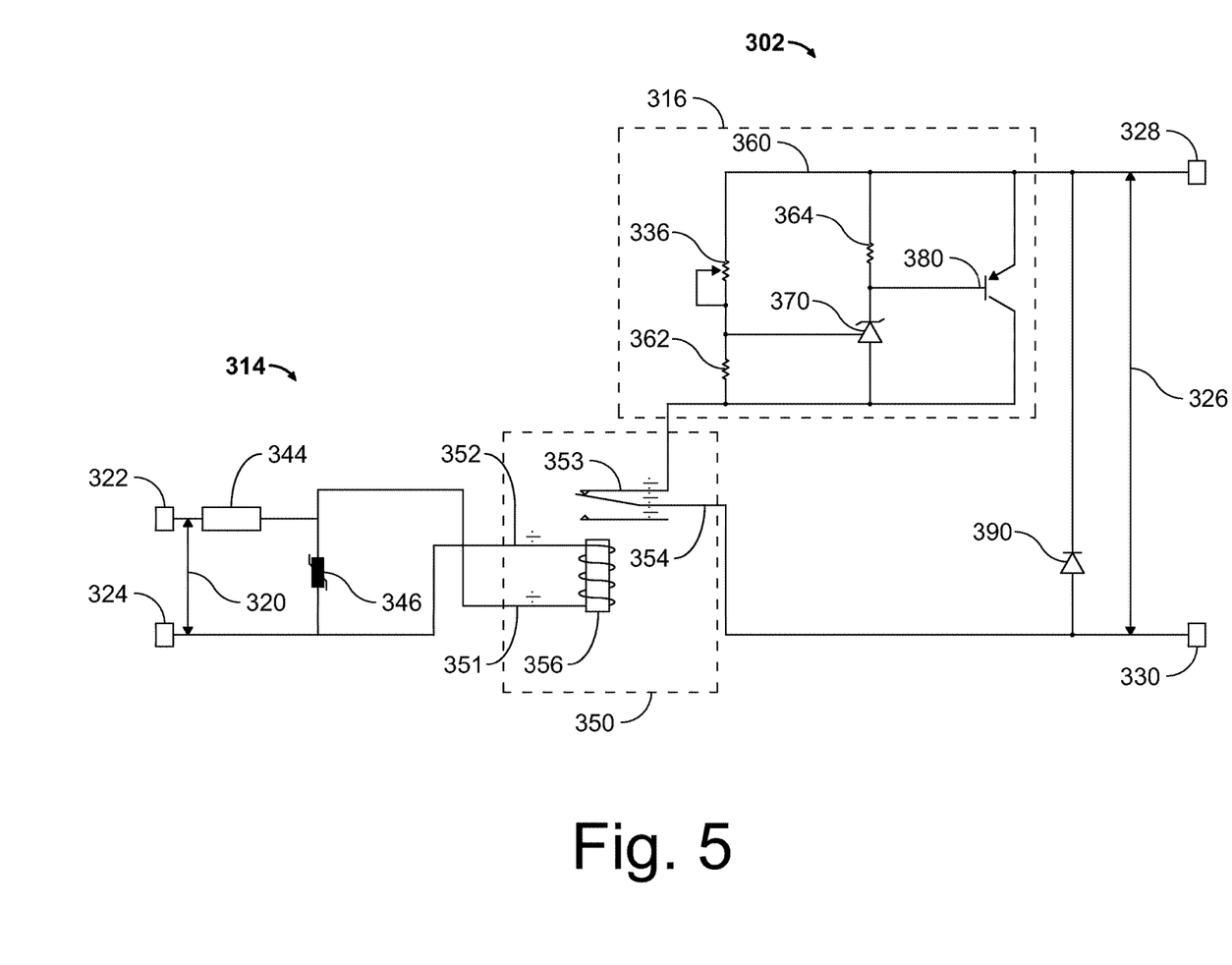
FIG. 5 is an illustrative circuit diagram of a second embodiment of the bi-level dimming controller of FIG. 3.

Referring to FIG. 5, another embodiment of dimming controller 302 includes a dim enable circuit 314, an isolating switch, for example a relay 350, and a dimming control circuit 316. In the illustrative embodiment, relay 350 advantageously provides electrical isolation between dim enable circuit 314 and dimming control circuit 316; however, alternative electrically isolating and/or non-isolating components known in the art can be substituted to provide the enable and disable of the dimming function for the dimming control circuit 316 based on the signal received across the detection signal input 320 of the dim enable circuit 314.

The illustrative dim enable circuit 314 includes a fuse 344 for short circuit protection and an MOV 346 for over voltage and surge protection. There is no diode for reverse protection when configured to work with an AC detection signal; however, if configured for a DC detection signal, a reverse protection diode (not shown) may be associated with the dim enable circuit 314. The relay 350 includes normally closed (NC) contacts 353 and 354 that provide continuity of the negative output node 330 to the dimming control circuit 316. In absence of a voltage across coil 356 of relay 530 (nodes 351 and 352) dimming is enabled. Alternatively, the contacts 353 and 354 can provide continuity of the positive output node 328 to the dimming control circuit 316. Also alternatively, the normally open contacts of the relay 350 could be used to reverse the logic and enable dimming when voltage is present at detection signal input 320.

The dimming control circuit 316 that provides a 0-10 VDC output at isolated dimming voltage output 326 includes a shunt regulator 370, resistors 360, 362, 364 and a transistor switch 380. The shunt regulator 370 can be an adjustable precision zener shunt regulator, for example, part LM431ACZ available from Fairchild Semiconductor, of San Jose, Calif., used in a high current shunt voltage regulator configuration. Specifically, resistors 360 and 362 set the voltage output of the shunt regulator 370, resistor 364 limits the current through the shunt regulator, and transistor switch 380 is used to increase current capacity of the dimming control circuit 316. Resistor 360 is a variable resistor, for example a potentiometer associated with the dimming preset selector 336. By adjusting the dimming preset selector 336, the ratio of the resistance for resistor 360 and 362 changes, changing the reference current to the adjustment node of the shunt regulator 370 and proportionally changing the voltage output provided across the isolated dimming voltage output 326.

Advantageously, the shunt regulator 370 of the dimming control circuit 302 provides a dynamic impedance so that the voltage output across the isolated dimming voltage output 326 that is set by a particular setting of dimming present selector 336 remains the same voltage regardless of the impedance or current coupled to the isolated dimming voltage output 326. Also advantageously, the only power required by the dimming control circuit 316 is the current provided by the dimming control input of the lighting driver 152 that the output nodes 328 and 330 are connected to.

A diode 390 may be coupled across the isolated dimming voltage output 326 with the cathode of the diode coupled to positive output node 330. The diode 390 provides reverse polarity protection in the event the dimming control input of a lighting driver 152 is improperly connected with the output nodes 328 and 330 of the dimming control circuit 302. If connected with reverse polarity, the diode 390 is forward biased and the voltage across the isolated dimming voltage output 326 equals the diode 390 voltage drop. For most lighting drivers, this typically drops the light level to less than 10% until the polarity of the dimming control input wires are properly matched with the positive output node 328 and the negative output node 330.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the claims and summary are desired to be protected.

The invention claimed is:

1. A dimming controller, comprising:
   a dimming preset selector for setting a preset dim level;
   a dimming control circuit responsive to the preset dim level to drive a dimming voltage output proportional to the preset dim level, the dimming control circuit further responsive to maintain the dimming voltage output for a varied electrical characteristic of dimming control inputs of at least one lighting driver; and
   a dim enable circuit responsive to a detection signal to selectively couple and uncouple the dimming voltage output to the dimming control input of the lighting driver, thereby providing switching between the preset dim level and a full light level.

2. The dimming controller of claim 1, wherein the varied electrical characteristic of the dimming control inputs is impedance and the dimming control circuit is responsive to maintain the same dimming voltage output for varied input impedances.

3. The dimming controller of claim 1, wherein the dimming control circuit provides a variable impedance output proportional to a current received from the dimming control inputs.

4. The dimming controller of claim 1, wherein a ground connection of the dimming voltage output is selectively coupled and uncoupled.

5. The dimming controller of claim 1, wherein the preset dim level is discretely selectable from a plurality of reference set points using the dimming preset selector.

6. The dimming controller of claim 1, wherein the preset dim level is proportionally selectable using the dimming preset selector.

7. The dimming controller of claim 1, wherein the detection signal is provided by an actuator.

8. The dimming controller of claim 7, wherein the actuator is a sensor.

9. The dimming controller of claim 1, wherein the detection signal is electrically isolated from the dimming voltage output.

10. The dimming controller of claim 1, wherein the dim enable circuit includes a relay for selectively connecting and disconnecting one of a supply and a return of the dimming voltage output from the dimming control input of the lighting driver.

11. The dimming controller of claim 1, wherein a line voltage for powering the lighting driver also powers the dimming controller.

12. The dimming controller of claim 1, further comprising a power supply circuit, the power supply circuit providing a power supply output voltage that is electrically isolated from a power supply input voltage.

13. The dimming controller of claim 1, wherein the dimming preset selector provides a voltage reference set point from a voltage divider.

14. The dimming controller of claim 1, wherein the dimming preset selector is a potentiometer.

15. The dimming controller of claim 1, wherein the varied electrical characteristic of the dimming control input for more than one lighting drivers connected in parallel is electrical current.

16. The dimming controller of claim 1, wherein the dimming control circuit includes a voltage buffer providing a variable impedance for the dimming voltage output.

17. The dimming controller of claim 16, wherein the voltage buffer is an operational amplifier.

18. The dimming controller of claim 17, wherein the operational amplifier is configured as a voltage follower.

19. A bi-level dimming controller configured to couple to a dimming control input of at least one lighting driver, comprising:
    a dimming preset selector configured to set a preset dim level;
    a dimming control circuit providing a dimming voltage output, the dimming control circuit responsive to the preset dim level to drive the dimming voltage output proportional to the preset dim level, the dimming control circuit further responsive to a varied impedance presented by the dimming control inputs of the at least one lighting driver to maintain the dimming voltage output irrespective of a change in the varied impedance; and
    a dim enable circuit responsive to a detection signal to selectively couple and uncouple a ground of the dimming voltage output to the dimming control input of the at least one lighting driver, thereby providing switching between the preset dim level and a full light level; and
    wherein the detection signal is electrically isolated from the dimming voltage output.

20. A bi-level dimming controller configured to couple to a dimming control input of at least one lighting driver, comprising:
    a dimming preset selector for setting a preset dim level;
    a dimming control circuit including a voltage buffer providing a dimming voltage output, the voltage buffer responsive to the preset dim level to drive a dimming voltage output proportional to the preset dim level; and
    a dim enable circuit responsive to a detection signal to selectively couple and uncouple at least one of a supply and a return of the dimming voltage output to the dimming control input of the at least one lighting driver, thereby providing switching between the preset dim level and a full light level.

* * * * *